May 29, 1923.

W. W. YALE

PULLEY

Filed March 23, 1921

1,457,130

Inventor

Warren W. Yale

By William J. Jacobi

Attorney

Patented May 29, 1923.

1,457,130

UNITED STATES PATENT OFFICE.

WARREN WESLEY YALE, OF CHICKASHA, OKLAHOMA, ASSIGNOR OF ONE-HALF TO ALEXANDER B. HICKMAN, OF CHICKASHA, OKLAHOMA.

PULLEY.

Application filed March 23, 1921. Serial No. 454,649.

*To all whom it may concern:*

Be it known that I, WARREN WESLEY YALE, a citizen of the United States, residing at Chickasha, in the county of Grady and State of Oklahoma, have invented certain new and useful Improvements in Pulleys, of which the following is a specification.

This invention relates to new and useful improvements in pulleys, and more particularly to a pulley designed to feed a substance to a belt whereby to prevent said belt from slipping on the pulley.

The primary object of the invention is to provide a device of this character in which the rim or felly is designed hollow within which the anti-slipping substance is supplied, said felly being provided with means whereby this substance is automatically fed to the belt extending thereover.

Another object of the invention resides in providing a pulley in the hollow felly on which are formed a plurality of openings in which are inserted porous plugs which feed the substance from within the pulley and transfer the same to the belt.

Still another object resides in providing a pulley which is simple and durable in construction, inexpensive to manufacture and one which will be very efficient and useful in operation.

With these and other objects in view my invention consists in the novel features of construction, combination and arrangement of parts as will be hereinafter referred to and more particularly pointed out in the specification and claims.

In the accompanying drawing—

Figure 1:
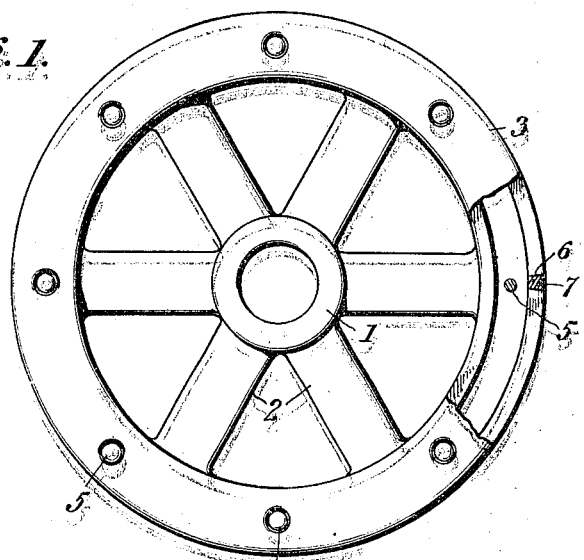
Figure 1 is a side elevation of a pulley constructed in accordance with my invention with parts broken away.
Figure 2:
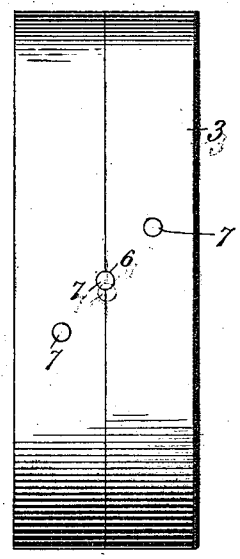
Fig. 2 is a front elevation of the same.
Figure 3:
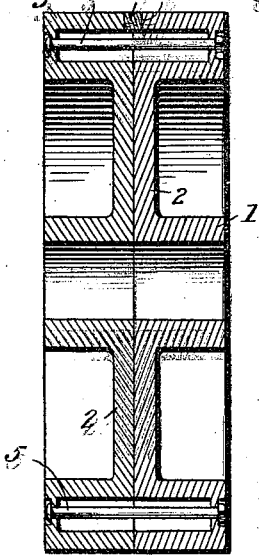
Fig. 3 is a longitudinal section therethrough as seen on the line 3—3 of Fig. 1.

In describing the invention I shall refer to the drawing in which similar reference characters designate corresponding parts throughout the several views, and in which 1 designates the hub of my improved pulley from which radiate a plurality of spokes 2, and 3 designates the felly thereof. This pulley is preferably cast in two sections and the felly designed hollow. The two sections of the pulley are held together by means of bolts 5 which extend through the hollow felly 3, as clearly shown in the drawing. While I have shown a pulley formed in two sections, it will be understood that the same may be cast integral if desired, as the particular construction thereof does not affect the results accomplished by the essential features of the invention hereinafter more fully described.

The outer peripheral rim of the felly 3 is provided at regular intervals with openings 6 in which are inserted plugs 7 formed of soft wood, fiber, or other porous material. These plugs may be termed oil feeders for the purposes hereinafter described.

In operation, the hollow felly 3 may be filled with a substance adapted to prevent a belt from slipping and as the pulley is rotated, this substance through capillary action and centrifugal force is adapted to be absorbed by the feeders 7 and passed to the inner face of the belt as the same operates over the pulley. Thus, the belt is supplied with this substance automatically, and slipping of the belt on the pulley is prevented.

There are various kinds of anti-slipping substances which may be used in carrying out my invention, as for example fish oil. I do not wish to limit myself to any particular kind of substance to be used, except that it be a substance of a certain adhesive or anti-slipping quality. It may be further desirable under certain circumstances to eliminate the feeders 7 and utilize an anti-slipping substance in powdered or paste form such as graphite, which may be fed directly to the belt throughout the openings 6 in the pulley.

From the foregoing it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to without departing from the spirit or sacrificing any of the principles of the invention.

Having thus described my invention, what I claim is:

1. A pulley wheel provided with a peripheral chamber adapted to contain an anti-slipping substance, and means for feeding said substance to a belt adapted to pass over said pulley wheel.

2. A pulley wheel provided with a peripheral chamber adapted to contain an anti-slipping substance, and feeders associated with said chamber for supplying said substance to a belt adapted to pass over said pulley wheel.

3. A pulley wheel having its periphery provided with a peripheral chamber adapted to contain an anti-slipping liquid, the outer wall of said chamber having openings therein, and porous feeders fitting within said openings for supplying said liquid to a belt adapted to pass over said wheel.

In testimony whereof I affix my signature.

WARREN WESLEY YALE.